May 30, 1967     M. L. CRIPE     3,321,916
SERVOMOTOR WITH NORMALLY STATIONARY VALVE STRUCTURE
Filed June 28, 1965
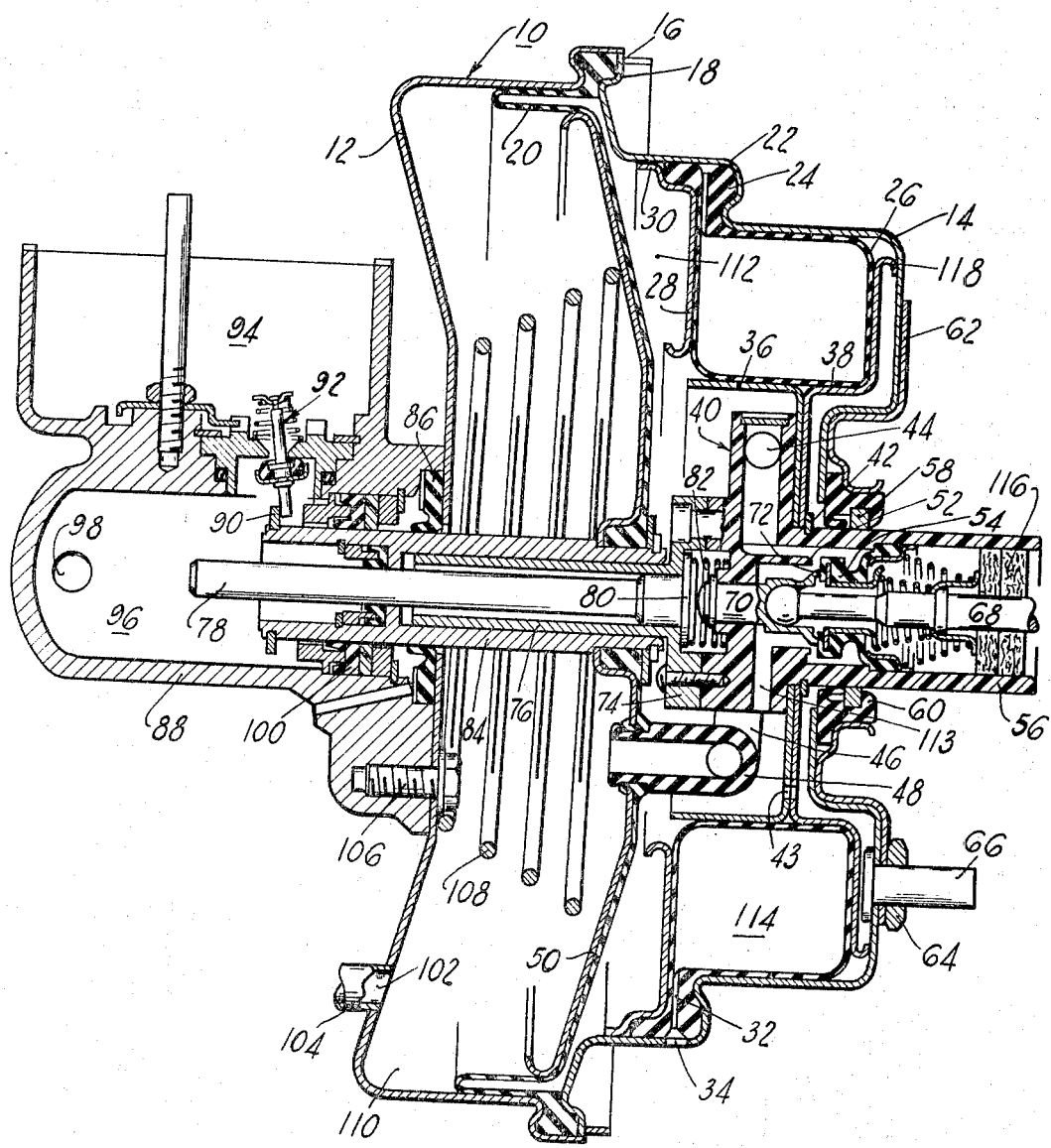
INVENTOR.
MAXWELL L. CRIPE
BY
Richard G. Geib
ATTORNEY

United States Patent Office 3,321,916
Patented May 30, 1967

3,321,916
SERVOMOTOR WITH NORMALLY STATIONARY
VALVE STRUCTURE
Maxwell L. Cripe, South Bend, Ind., assignor to The
Bendix Corporation, South Bend, Ind., a corporation
of Delaware
Filed June 28, 1965, Ser. No. 467,284
8 Claims. (Cl. 60—54.5)

The present invention relates to fluid pressure servomotors; and more particularly to vacuum actuated fluid pressure servomotors.

An object of the present invention is the provision of the new and improved fluid pressure servomotor for power brakes and the like whose control valve does not provide a follow-up action of its driven elements when power is available to actuate the fluid pressure servomotor until power run-out is experienced whereupon manual follow-up will actuate the driven element and its associated pressure producing means. Power run-out may be characterized as when the servomotor has maximum control pressure being applied to the unit without being able to further increase the hydraulic braking pressure as would occur also upon power failure whereupon the differential is destroyed across a servomotor piston or the like.

A more particular object of the present invention is the provision of a new and improved fluid pressure servomotor having three variable volume chambers two of which are axially aligned and the third is within a flexible movable wall.

Still another object of this invention is to provide a servomotor having a master cylinder attached thereto with two movable walls in said servomotor, one of which is a hollow movable wall that is open to a reference pressure at all times and capable of holding a valve mechanism from traveling until such time as power-run-out condition has been experienced with the other movable wall.

It is a still further object to provide such a servomotor with a force transmitting means internally of a master cylinder which creates a hydraulic pressure in the master cylinder that reacts on a hydraulic plunger to transmit the reaction pressure back to the valve mechanism to provide an operator of the servomotor with a "feel" of the braking operation.

Other objects and advantages of my invention will become apparent from the following description of the drawing showing a cross sectional view of the servomotor and master cylinder in accordance with the principles of my invention.

With more particular regard to the drawings we show a servomotor 10 comprising a forward shell 12 and a rear shell 14 joined as at 16 with a bead 18 of a rolling type diaphragm 20 interposed between the shells. In addition the rear shell 14 is formed with a shoulder 22 against which a beaded portion 24 of a hollow diaphragm 26 is held by means of a plate 28 having spring fingers 30 that are normally at an angle to the sidewalls of the rear shell 14 until the plate is inserted therein. As seen the hollow diaphragm 26 is open by means of a passage 32 to a radial opening 34 in the rear shell 14 so that in this embodiment the internal area of the hollow diaphragm 26 is filled with atmospheric pressure.

The hollow diaphragm is positioned in the rear shell adjacent the outermost portion thereof by means of two support plates 36 and 38 which are, in turn, held to a valve housing 40 by means of a snap ring 42. An opening 43 is provided in plates 36 and 38 for fluid communication. The valve housing 40 is provided with a fluid pressure inlet 44 which is connected with a rubber hose 46 that is, at its other end, communicated with a fitting 48 extending through the diaphragm 20 and a support plate 50 therefor. Internally the valve housing is provided with an annular valve seat 52 and a valve poppet 54. As seen, the valve housing has a tubular portion 56 which extends rearwardly from shell 14. The portion 56 is supported by means of a bearing 58 and seal 60. The bearing and seal are attached to the rear shell 14 by means of a plate 62 that may be snapped over the seal in the rear shell and held by means of nuts 64 spaced around the rear edge on bolts 66. The bolts 66 may serve also as mounting bolts for the servomotor 10 to a firewall of the vehicle or some such similar structure.

The valve is also arranged to have an operator-operated push rod 68 reciprocably supported on the axis of the valve housing by means of a plunger 70 that is also provided with a rearwardly facing valve seat 72 which in the released position shown maintains poppet 54 away from the seat 52.

Valve housing 40 is joined with a plate 74 that projects forwardly in the form of a tube 76 through the diaphragm 20 and plate 50. Centrally of the tube 76 I have provided a hydraulic reaction plunger 78 that terminates in a face 80 which is biased by means of a spring 82 to be in spaced relationship from the plunger 70. The tubular portion 76 is slidably received by a hydraulic plunger or force transmitting member 84 that projects through a seal 86 about an opening in the forward side of the front shell 12 into a master cylinder 88.

The forward face of the plunger 84 is provided with a valve displacing member 90 for operating a tilt valve 92 to, in the released position shown, communicate a reservoir 94 of the master cylinder 88 with an internal chamber 96 to allow the replenishing of fluid in the released position. The master cylinder is provided with an opening or outlet 98 to permit fluid displaced by plunger 84 to be exhausted to hydraulic motors or the like, such as wheel cylinders of a brake system. Appropriate seal means 100 cooperate with the plunger 84 in sealing the rear opening of the master cylinder 88 as well as supporting the plunger 84 in its reciprocation therein.

The front shell 12 is also provided with an opening 102 to which is connected a conduit 104 that leads to a fluid power source, such as a vacuum reservoir or intake manifold for an automobile engine. The servomotor could be operated by superatmospheric pressure, in which event a conduit could feed superatmospheric pressure to the valve housing and the hollow movable wall and opening 102 would be open to atmosphere.

As seen, the master cylinder is held to the forward shell by means of a plurality of bolts 106.

The diaphragm 20 and plate 50 are positioned within the servomotor 10 by means of a return spring 108 which will maintain the diaphragm in the position shown during the nonactuated condition for the servomotor. As presently visualized, I have shown the communication of vacuum by means of the fitting 48 and hose 46 from a forward chamber 110 of the servomotor to a control chamber 112 via a radial passage 113 in the valve housing 40. Thus, vacuum surrounds the hollow diaphragm 26, and, as atmosphere is in internal chamber 114 of diaphragm 26, the diaphragm is expanded to rearwardly position the valve housing 40 and the operator-operated push rod 68.

In operation an operator will push upon a brake pedal or operate a lever connected to the push rod 68 to first allow the poppet 54 to seat upon the valve seat 52 to close off vacuum supply to chamber 112 via passage 113. Thereafter further movement of plunger 70 removes the plunger seat 72 from the poppet to communicate fluid passing internally of the poppet from a filter 116 to the control chamber 112 via passage 113. During this initial movement the forward face of plunger 70 approaches the face 80 of the reaction plunger 78 but does not contact same until hydraulic pressure developed in master cylinder 88 is sufficient to cause the wheel cylinders to expand the brake shoes into contact with the brake drums.

As the power source is normally thought of as being a vacuum such as in the intake manifold of an automobile engine the control chamber will have introduced into it at this point atmospheric pressure passing through the filter means 116 to cause the wall 20 and plate 50 to move forwardly against the return spring 108 and displace the plunger 84 into the master cylinder 96 to operate the hydraulic motor.

While this is happening the pressure in 112 is still of a lesser magnitude than the atmospheric pressure within the chamber 114 of hollow diaphragm 26 so that the hollow diaphragm will remain expanded to hold the valve 40 to the rear where the return flange 118 of the plate 38 is resting upon the rear shell 14.

It will thus be surmised that the push rod 68 will only move a sufficient amount to open the valve seat 72 of the plunger 70 and thereafter be held from following up the motion of the diaphragm 20.

In addition, as the pressure within the master cylinder 96 builds up beyond that initially mentioned above it acts upon the reaction plunger 78 to eventually compress the spring 82 and abut upon the forward face of the plunger 70 to further provide reaction forces for the operator after the hydraulic motor has reached an operating condition. When the chamber 112 has been opened sufficiently that it is completely atmospheric, the hollow diaphragm 26 will be suspended in atmospheric pressure to allow the collapsing thereof to permit push rod 68 to act upon the reaction plunger 78 and follow through manually to additionally displace fluid from the master cylinder 88 to the hydraulic motors. As is obvious, if there is a power failure this suspension of diaphragm 26 would occur immediately upon the approach of atmospheric suspension of the diaphragm 20.

As other means of visualizing the invention described in detail above will appear to those skilled in the art to which it relates, I do not wish to be limited by this description but rather by the scope of the appended claims.

I claim:
1. A servomotor comprising:
   a housing;
   a movable wall means internally of said housing dividing said housing into a first chamber, a second chamber and a third chamber;
   a force transmitting means operatively connected to a portion of said movable wall means, which force transmitting means is arranged to project from said housing;
   an operator-operated control member operatively connected to another portion of said movable wall means, which operator-operated control member projects from the rearward side of said housing;
   a valve mechanism operatively connected to said operator-operated control means and to another portion of said movable wall means to be positioned in accordance with a pressure differential across said another portion of said movable wall means to allow for relative movement of said portion of said movable wall means and said valve mechanism; and
   a master cylinder operatively connected to said valve means and reciprocatorily receiving said force transmitting member such that upon inward movement of said force transmitting member into said master cylinder fluid is displaced therefrom; and
   hydraulic reaction means slidably mounted in said force transmitting means and operatively connected to said valve mechanism to convey reaction forces from said master cylinder to said valve mechanism and therethrough to the operator-operated control member.

2. A servomotor in accordance with claim 1 wherein said another portion of said movable wall means includes a hollow diaphragm whose internal cavity is opened to atmospheric pressure, which internal cavity forms the third chamber for said servomotor.

3. A servomotor in accordance with claim 2 and further comprising a conduit for communicating fluid pressure within said first chamber to said valve mechanism which in the released condition communicates said fluid of said first chamber to said second chamber and in an actuated position is arranged to terminate said communication and introduce atmospheric pressure to said second chamber such that when said second chamber pressure equals the pressure internally of said hollow diaphragm said valve mechanism is allowed to follow-up said force transmitting means and manually actuate said master cylinder.

4. A servomotor in accordance with claim 1 wherein said movable wall means includes a first piston affixed to said force transmitting means and a second piston affixed to said valve mechanism and operatively connected to said first piston with conduit means communicating said first chamber thru said valve mechanism to said second chamber to surround the third chamber in said second piston, such that said second chamber acts as a control chamber and in the released condition receives said power source from said valve mechanism and in the actuated condition receives a fluid pressure differing from said power source at the command of said valve mechanism to lessen and possibly destroy the pressure differential across said second piston whereupon said second piston will follow-up said first piston.

5. A servomotor in accordance with claim 2 wherein said force transmitting means includes a reaction plunger operatively connected to a resilient member in said valve mechanism and to convey reaction to said operator-operated control member during actuation of said servomotor.

6. A servomotor comprising:
   a housing having a front shell and a rear shell;
   a means to join said front and rear shells;
   a rolling diaphragm having a peripheral bead between said shells to seal the juncture of same, said rolling diaphragm extending inwardly of said shells and being provided with an axially thickened portion;
   a force transmitting means centrally of said housing and reciprocatorily mounted through said front shell to project inwardly of said housing, said force transmitting means including a hydraulic reaction plunger within a tubular means along the axis of said force transmitting means, said force transmitting means being operatively connected to said rolling diaphragm;
   a hollow, flexible movable wall in said housing behind said rolling diaphragm in said rear shell, said hollow flexible movable wall being affixed to said housing, said hollow movable wall having a conduit leading to a reference pressure source to fill said hollow movable wall with a first pressure medium;
   a valve mechanism in fluid communication with said first pressure medium, said valve mechanism being operatively connected to said rear shell of said housing to said hollow movable wall, said valve mechanism being affixed to said tubular means projecting internally of said force transmitting means and being operatively connected with said hydraulic reaction plunger;
   a means to introduce a second pressure medium to said valve mechanism to be controlled thereby that will create a pressure differential across said hollow movable wall to expand said hollow movable wall and hold said valve mechanism rearwardly in said rear shell until said first pressure medium suspends said hollow movable wall; and
   a push rod reciprocatorily mounted through said rear shell forwardly to operate said valve mechanism, said push rod arranged to be movable relative to said valve housing and having a forward end normally spaced from said hydraulic reaction plunger such that initial movement of said valve mechanism may be accomplished by said push rod without impinging said valve mechanism may be accomplished by said push rod without impinging upon said hydraulic reaction plunger.

7. A servomotor according to claim 8 and further comprising a master cylinder having a cylindrical bore operatively receiving said force transmitting means and said hydraulic plunger, said master cylinder being mounted to said rear shell of said housing for said servomotor.

8. A servomotor comprising:
- a housing having a front shell and a rear shell;
- a means to join said front and rear shells;
- a first movable wall internally of said housing;
- a force transmitting means operatively connected to said first movable wall arranged to project said housing;
- a second movable wall having an internal chamber in said housing including a connecting means to operatively connecting said first movable wall and said second movable wall;
- a valve mechanism operatively connected to said hollow second movable wall to control the servomotor including, a push rod projecting internally of said housing and a reaction mechanism in the form of a hydraulic plunger operatively connected to said force transmitting means to impart reactive forces to said second movable wall and to said push rod;
- means to provide a first fluid pressure source to said valve mechanism and internally of said second movable wall;
- means to provide a second fluid pressure source on one side of said first movable wall; and
- conduit means for supplying said second pressure source to said valve mechanism to normally suspend said first movable wall and create a pressure differential across the exterior portions of said second movable wall in said second pressure source which is valved off as a control pressure is developed by said first fluid pressure source to progressively destroy the pressure differential across said second movable wall until said second movable wall is in suspension to allow manual follow-up of said valve mechanism.

No references cited.

MARTIN P. SCHWADRON, *Primary Examiner.*

R. R. BUNEVICH, *Assistant Examiner.*

UNITED STATES PATENT OFFICE
CERTIFICATE OF CORRECTION

Patent No. 3,321,916                          May 30, 1967

Maxwell L. Cripe

It is hereby certified that error appears in the above numbered patent requiring correction and that the said Letters Patent should read as corrected below.

Column 5, lines 5 and 6, strike out "said valve mechanism may be accomplished by said push rod without impinging" same column 5, line 21, for "to" read -- for --.

Signed and sealed this 10th day of December 1968.

(SEAL)
Attest:

Edward M. Fletcher, Jr.                          EDWARD J. BRENNER
Attesting Officer                                Commissioner of Patents